United States Patent Office 2,873,810
Patented Feb. 17, 1959

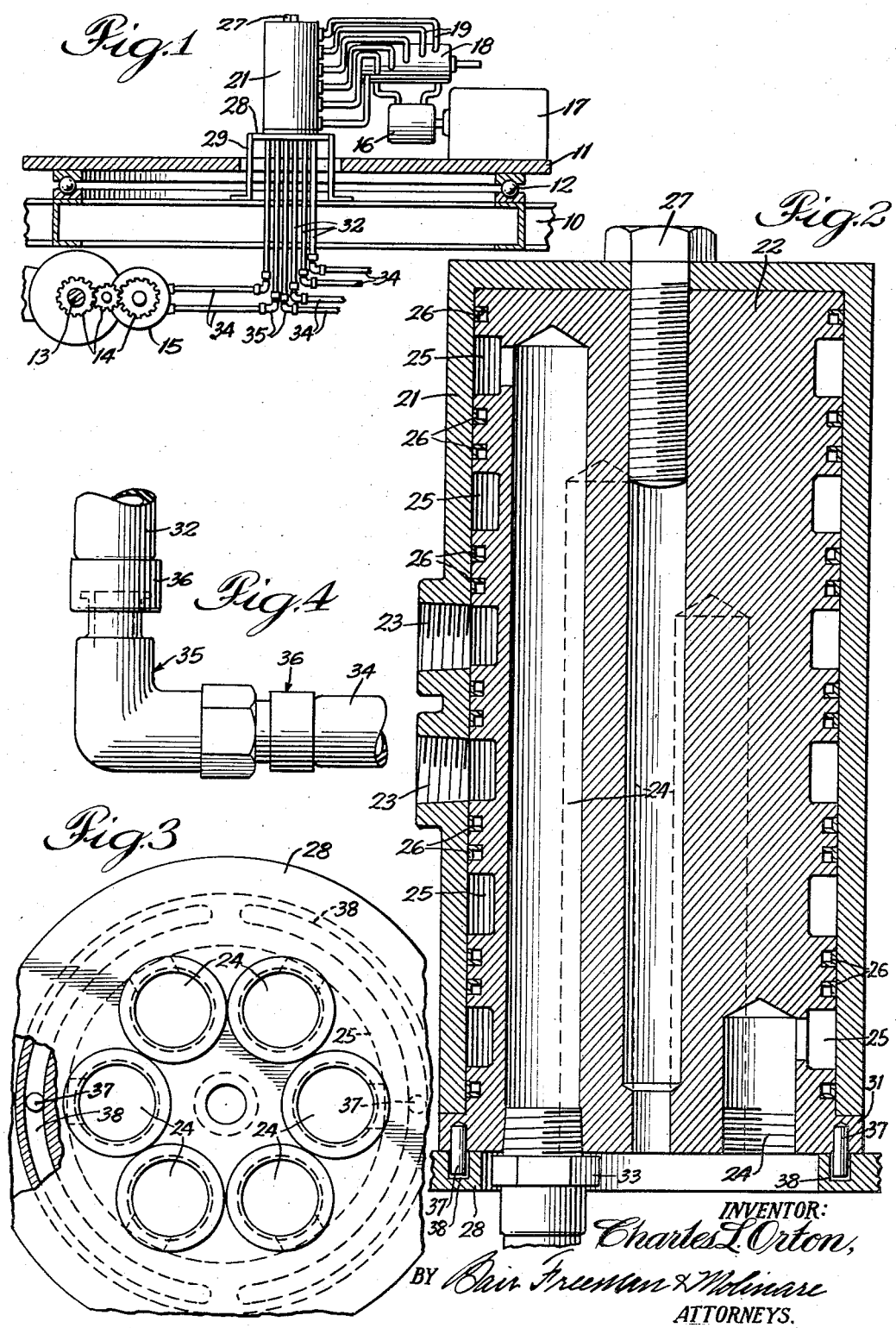

2,873,810

MULTIPLE FLUID COUPLING FOR RELATIVELY MOVABLE VEHICLE PARTS

Charles L. Orton, Salt Lake City, Utah

Application January 20, 1958, Serial No. 710,064

6 Claims. (Cl. 180—66)

This invention relates to rotary fluid couplings and more particularly to a multiple rotary joint construction for conducting several lines of fluid between relatively rotating parts such as the turntable and car body of a traveling crane, shovel, dragline or the like.

In transferring fluid under relatively high pressure between a car body and turntable of a traveling crane or the like as, for example, to supply fluid from a pump on the turntable to a hydraulic propelling motor of the car body a number of different problems are encountered which are peculiar to machinery of this general type. In such service the coupling between the car body and turntable must be capable of rotation up to at least about 270° and preferably of continuous rotation, must permit operation in a working sector of about 150° with travel of the crane possible during operation in a given sector, and must permit changing of the sector although traveling of the crane is rarely if ever necessary during sector changes.

Swivel joints have commonly been used to accommodate relative rotation in fluid couplings but conventional swivel joints are not satisfactory for service in traveling cranes and the like because of the severe service requirements. For example, in a typical traveling crane installation it may be necessary to accommodate six or more 2 inch diameter conduits to accommodate liquid flow at pressures on the order of 1,500 lbs. per square inch. This means that the core and casing of the swivel joint must have a relatively large diameter on the order of 6 inches or more so that the seals are of large diameter and are subjected to high fluid pressures. If a 20% coefficient of friction is assumed it requires about 106,000 inch pounds to turn the core relative to the casing of the swivel and the shear loading on the seals is 2,250 lbs. per square inch. Obviously the seals will fail very quickly if the core and the casing are turned under pressure but can easily withstand the required pressure under static conditions or can be turned relatively easily under low pressures.

It is one of the objects of the present invention to provide a rotary fluid coupling which satisfies all of the requirements for use with traveling cranes and the like.

Another object is to provide a rotary fluid coupling in which relative rotation within a given limited sector is accomplished by flexing of flexible conduits leading to a swivel connector and relative rotation to change sectors or beyond the limits of a sector is accommodated by relative turning of the casing and core of the swivel connector.

According to a feature of the invention one element of the swivel connector, preferably the core, is connected through a lost motion connection to the car body or turntable on which it is mounted for limited rotation sufficient to accommodate movements within a sector while limiting the amount of rotation to prevent damage to the flexible conduits.

According to another feature the flexible conduits include vertical portions connected to the swivel connector and horizontal portions connected to the vertical portions through relatively small angle swivels.

The above and other objects and features of the invention will be more readily apparent from the following description when read in connection with the accompanying drawing in which:

Figure 1 is a diagrammatic vertical section with parts in elevation through a portion of a traveling crane equipped with a rotary fluid coupling embodying the invention;

Figure 2 is an enlarged axial section through the swivel connector;

Figure 3 is a partial plan view looking from the bottom of Figure 2 with parts broken away; and Figure 4 is a partial elevation showing the connection between different portions of the angle connectors in the flexible conduits.

As illustrated in Figure 1, the connector of the invention is applied to a traveling crane or similar machine comprising a car body indicated generally at 10 and a turntable 11 mounted for rotation on the car body on a vertical axis by means of an annular bearing 12. The car body may be supported on wheels for operation on a railroad track, a roadway, or the like, and in the embodiment illustrated the wheels are carried by axles 13 which are adapted to be driven through gearing 14 by separate hydraulic motors 15.

Fluid for operating the hydraulic motors 15, as well as for operating additional hydraulic motors on the turntable for moving the crane or other load handling mechanism, may be supplied by a pump 16 driven by an engine 17 such as an internal combustion engine. The liquid from the pump may be supplied to the several different motors through selector valves and the selector valve for controlling the supply of fluid to the propelling motors 15 is generally indicated at 18. As shown, the valve 18 has supply and return connections to the pump 16 and has a series of six conduits 19 connected thereto which constitute the supply and return connections for the several motors 15. By operation of the valve the motors 15 may be supplied with operating liquid in parallel or in series or in other desired combinations to propel the car body in the desired direction and at the desired speed.

For conveying liquid between the selector valve 18 and the motors 15 a rotary fluid coupling is provided which will maintain communication between the valve and motors regardless of rotation of the turntable on the car body. As best seen in Figure 2, the coupling comprises an outer cylindrical casing 21 and a cylindrical core indicated generally at 22 which fits rotatably in the casing 21. The casing 21 is provided with a series of ports 23 in one side thereof which are axially spaced and to which the conduits 19 may be connected. The casing is held against rotation realtive to the turntable and for this purpose the conduits 19 may be rigid metal pipes.

The core 22 is provided with a series of axially extending bores 24 which are spaced as shown in Figure 3 and which are of different axial depths as indicated in Figure 2. Each bore 24 is connected to an annular groove or channel 25 in the periphery of the core and the grooves or channels 25 are spaced to register with the ports 23 to establish communication therebetween. The core also carries flexible annular sealing rings 26 lying on opposite sides of the annular grooves or channels 25 to seal against any substantial loss of fluid between the ports and channels. The core may be held assembled in the casing by a fastening such as a screw 27 threaded into the end of the core and engaging the top of the casing so that the core and casing are held against axial separation while being permitted to rotate relative to each other.

The core is carried by the car body and, as shown in Figure 1, may be mounted on a mounting plate 28 which is rigidly secured to the car body as by means of legs 29 which project through an opening in the turntable. The core 24 is provided with an outwardly extending flange 31 and with a flat base which rests on the mounting plate 28. The mounting plate 28 as seen in Figure 2 is formed with an enlarged central opening therein through which conduits may pass as described hereinafter but which is smaller than the diameter of the flange 31 so that the core rests rotatably on the mounting plate with its axis coaxial with the axis of rotation of the turntable.

The passages 24 in the core are adapted to be connected to the several propelling motors 15 and for this purpose, according to the present invention, flexible conduits such as hose 32 are provided. According to a feature of the invention the hoses include vertically extending portions which are secured to the passages 24 by means of conventional rigid couplings 33 and which project vertically downward therefrom through the opening in the mounting plate 28 and through a central opening in the turntable. At their lower ends the vertical portions of the hoses are connected to horizontally extending hoses 34 which are in turn connected to the propelling motors 15. In order to increase the flexibility of the hoses where required the vertically and horizontally extending portions thereof may be joined through angle swivel connections 35 as best seen in Figure 4. As shown, each of these angle swivel connections includes a right angle pipe section connected at its opposite ends through swivel joints 36 to the respective hose sections. Since the swivel joints 36 are of relatively small diameter and do not have to accommodate continuous rotation they can be utilized effectively even at the high pressures involved.

To prevent overstressing of the flexible conduits rotation between the core 24 and the car body is limited. For this purpose a lost motion connection is provided, as shown in Figure 2, which may comprise pins 37 extending into arcuate grooves 38 in the upper surface of the mounting plate 28. The grooves as best seen in Figure 3 extend through the full angle in which it is desired to have the crane or other mechanism operate in a given sector of operation so that during turning within the sector the pins 37 can travel through the grooves. When the pins reach the ends of the grooves further rotation between the core and turntable will be prevented and the grooves are designed to limit rotation to an amount which can be accommodated by flexing of the conduits 32 and 34 without damage thereto.

In operation the crane or the like may be moved to a desired location by means of the propelling motors 15 and the turntable may be turned to the desired sector of operation relative to the crane position. This can be done without pressure being supplied to the propelling motors since it is rarely, if ever, necessary to turn the turntable to select a sector of operation while the car body is being propelled. With the structure illustrated the crane or similar load handling means may be brought into operation and may be turned by turning the turntable to different angles within the sector. During this type of operation it is frequently necessary to move the crane and when such movement is desired liquid may be supplied to the propelling motors simultaneously with operation of the crane. When such simultaneous movements occur the seals 26 will be under pressure and will offer relatively high resistance to turning so that the flexible conduits 32 and 34 will flex to accommodate the turning of the turntable without turning the core in the casing and damaging the seals.

When a new sector is to be selected the turntable may be turned further but at this time the propelling motors 15 will normally not be in operation so that there is no pressure on the seals 26. The core and casing may, therefore, turn freely relative to each other without damaging the seals in the selection of a new sector of operation. Thus by the present invention the severe service requirements of traveling cranes and the like having hydraulic propulsion are completely satisfied and the mechanism is capable of functioning over a long period of time efficiently and without appreciable wear.

While one embodiment of the invention has been shown and described in detail it will be understood that this is illustrative only and is not to be taken as a definition of the scope of the invention, reference being had for this purpose to the appended claims.

What is claimed is:

1. A rotary fluid coupling for transmitting fluid between relatively rotatable parts comprising a cylindrical core having an axially extending passage therein terminating in a port in the side of the core, a cylindrical casing fitting rotatably over the core and having a port in its side wall registering with the port in the core, one of the ports being an annular groove to maintain communication between the ports in different angular positions of the core and casing, means to connect the core and casing to said parts respectively for rotation therewith, one of said means being a lost motion connection to permit limited relative rotation between one of the parts and the core or casing element to which it is connected, and a flexible fluid conduit connected to said element in communication with the port therein and to a point on said one of the parts spaced fom said element and flexing as the parts turn relative to each other through the angle permitted by the lost motion connection without causing relative turning of the core and casing.

2. A rotary fluid coupling for transmitting fluid between relatively rotatable parts comprising a cylindrical core having an axially extending passage therein terminating in a port in the side of the core, a cylindrical casing fitting rotatably over the core and having a port in its side wall registering with the port in the core, one of the ports being an annular groove to maintain communication between the ports in different angular positions of the core and casing, annular seals between the core and casing on opposite sides of the ports, means connecting the casing to one of the parts for rotation therewith, lost motion means connecting the core to the other of the parts for limited rotation relative thereto, and a flexible fluid conduit connected to the passage in the core and extending axially therefrom and connected to a point on said other of the parts spaced from the core, said conduit flexing to accommodate turning of the core relative to said other of the parts through the angle permitted by the lost motion connection without causing relative turning of the core and casing.

3. The construction of claim 2 in which the flexible fluid conduit includes a first portion extending axially from the core, a second portion at a right angle to the first portion, and an angle swivel connection between the first and second portions.

4. A rotary fluid coupling for transmitting fluid between relatively rotatable parts comprising a cylindrical core having a plurality of spaced axially extending passages therein terminating in axially spaced annular grooves in the outer surface of the core, a cylindrical casing fitting rotatably over the core and having axially spaced ports in its side wall registering with the grooves respectively, annular sealing rings carried by the core on opposite sides of each of the grooves, means connecting the casing to one of the parts for rotation therewith, lost motion means connecting the core to the other part for limited rotation relative thereto, and a plurality of flexible conduits connected to the passage respectively and extending axially from the core and flexing to accommodate turning of the core relative to said other part through the angle permitted by the lost motion means without causing relative turning of the core and casing.

5. In combination with a travelling crane having a car body, a turntable mounted for rotation on the body on a vertical axis, a pump on the turntable, and a propelling motor on the car body, a rotary fluid coupling comprising a cylindrical casing mounted on the turntable coaxial with the axis of rotation thereof and held against rotation relative thereto and having axially spaced ports in its side wall, means connecting the ports to the pump for fluid flow therebetween, a cylindrical core fitting rotatably in the casing and having a series of axial passages therein terminating in annular channels registering with the ports in the casing respectively, annular seals carried by the core on opposite sides of the annular channels sealingly engaging the casing, lost motion means connecting the core to the car body for limited rotation relative thereto, and flexible conduits connecting the passages in the core to the propelling motor.

6. The combination of claim 5 in which the flexible conduits include vertical portions extending downward from the core, horizontal portions connected to the motor, and angle swivel connections between the vertical and horizontal portions.

References Cited in the file of this patent

UNITED STATES PATENTS

| | | |
|---|---|---|
| 2,557,498 | Collender | June 19, 1951 |
| 2,590,787 | Nickles | Mar. 25, 1952 |
| 2,768,843 | Zeilman | Oct. 30, 1956 |
| 2,781,134 | Weir et al. | Feb. 12, 1957 |